United States Patent
Katou

(10) Patent No.: US 7,209,828 B2
(45) Date of Patent: Apr. 24, 2007

(54) NAVIGATION APPARATUS FOR A VEHICLE AND PROGRAM WHICH CONTROLS THE APPARATUS

(75) Inventor: Kiyohide Katou, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 258 days.

(21) Appl. No.: 10/743,008

(22) Filed: Dec. 23, 2003

(65) Prior Publication Data

US 2004/0148094 A1 Jul. 29, 2004

(30) Foreign Application Priority Data

Jan. 23, 2003 (JP) .............................. 2003-015358

(51) Int. Cl.
*G01C 21/00* (2006.01)
(52) U.S. Cl. .................. 701/201; 701/25; 701/206; 701/208; 340/988; 340/990
(58) Field of Classification Search ........ 701/200–202, 701/207–211, 23–25; 340/988–990, 992, 340/995.19, 995.21, 995.22, 995.23; 73/178 R
See application file for complete search history.

(56) References Cited

U.S. PATENT DOCUMENTS

| 5,486,822 | A | * | 1/1996 | Tenmoku et al. ...... 340/995.22 |
| 5,506,779 | A | * | 4/1996 | Kanki .......................... 701/209 |
| 5,899,955 | A | * | 5/1999 | Yagyu et al. ................ 701/209 |
| 6,047,235 | A | * | 4/2000 | Hiyokawa et al. .......... 701/201 |
| 6,351,707 | B1 | * | 2/2002 | Ichikawa ..................... 701/209 |
| 6,591,188 | B1 | * | 7/2003 | Ohler .......................... 701/209 |
| 6,751,548 | B2 | * | 6/2004 | Fox et al. .................... 701/201 |
| 2004/0098194 | A1 | * | 5/2004 | Baur et al. .................. 701/209 |
| 2004/0102899 | A1 | * | 5/2004 | Kaji et al. ................... 701/210 |
| 2004/0148095 | A1 | * | 7/2004 | Katou ......................... 701/201 |

FOREIGN PATENT DOCUMENTS

| JP | A 08-16991 | 1/1996 |
| JP | A 09-292251 | 11/1997 |
| JP | A-2000-018955 | 1/2000 |
| JP | A 2001-227965 | 8/2001 |
| JP | A 2002-027532 | 1/2002 |
| JP | A-2002-174529 | 6/2002 |
| JP | A 2002-310696 | 10/2002 |
| JP | A 2002-318126 | 10/2002 |

* cited by examiner

*Primary Examiner*—Gertrude A. Jeanglaude
(74) *Attorney, Agent, or Firm*—Oliff & Berridge, PLC

(57) ABSTRACT

A navigation apparatus for a vehicle registers a place of departure, a destination, and a route traveled by the vehicle; determines whether an input place of departure and input destination are respectively substantially the same as a place of departure and destination of a registered route, an input place of departure and an input destination being substantially the same as a respective place of departure and destination of a particular registered route when the input place of departure is within a predetermined distance of the place of departure of the particular registered route and the input destination is within the predetermined distance of the destination of the particular registered route; reads out the particular registered route from registered route information; and performs route guidance based on a route returned.

14 Claims, 10 Drawing Sheets

```
PLACE OF DEPARTURE A → DESTINATION B

DISTANCE        △△ km
TIME            ×× minutes

REGISTER THIS ROUTE?

YES          NO
```

COMPARISON OF REGISTERED ROUTES (WEEKDAY, DAYTIME)

COMPARISON OF REGISTERED ROUTES (WEEKDAY, EVENING)

NAVIGATION APPARATUS FOR A VEHICLE AND PROGRAM WHICH CONTROLS THE APPARATUS

INCORPORATION BY REFERENCE

The disclosure of Japanese Patent Application No. 2003-015358 filed Jan. 23, 2003, including specification, drawings, and claims is incorporated herein by reference in its entirety.

BACKGROUND OF THE INVENTION

1. Field of Invention

The present invention relates to vehicle navigation apparatus and a programs control vehicle navigation apparatus.

2. Description of Related Art

In a conventional navigation apparatus, when a place of departure (or the current position), and a destination are input, search data, such as road data, are read out and a route search is performed based on preset search logic, for example, the shortest traveling distance, or preference for a particular road type. When a user selects one of the routes that are returned by a search, the user is guided by visual signals and/or audio signals along the selected route until the user reaches the destination.

In some cases, however, a route returned by a search based only on search logic and search data as described above may not be a route that the user prefers. Therefore, conventional navigation apparatus accumulate driving data and predict a user's preferences, such as a road or roads that the user prefers, and search for a route accordingly. For example, Japanese Patent Application Laid-Open No. 9-292251 describes a navigation apparatus that stores the number of times that a user has passed certain intersections and searches for a route by giving preference to routes containing intersections that the user frequently passes. Japanese Patent Application Laid-Open No. 8-16991 describes another navigation apparatus that registers traveling circumstances such as a width of road, a kind of road, or traveling speed and predicts a user's preferences based on the registered traveling circumstances.

SUMMARY OF THE INVENTION

However, in the above-described navigation apparatus, because the navigation apparatus considers a user's preferences, such as a user's favorite roads, and gives preference to routes that match the user's preference, the navigation apparatus may return an indirect route. Consequently, in these circumstances the above-described navigation apparatus are incapable of returning a direct route.

Therefore, according to the present invention, there is provided a navigation apparatus for a vehicle including a registration means for registering a place of departure, a destination, and a route traveled by the vehicle; a determination means for determining whether an input place of departure and input destination are respectively substantially the same as a place of departure and destination of a registered route, an input place of departure and an input destination being substantially the same as a respective place of departure and destination of a particular registered route when the input place of departure is within a predetermined distance of the place of departure of the particular registered route and the input destination is within the predetermined distance of the destination of the particular registered route; a route search means for reading out the particular registered route from registered route information; and a control means for performing route guidance based on a route returned by the search means.

Further, according to the present invention, there is provided a navigation apparatus for a vehicle including a registration means for registering a place of departure, a destination, and a route traveled by the vehicle; a determination means for determining whether an input place of departure and input destination are respectively substantially the same as respective places of departure and destinations of one or more registered routes, an input place of departure and an input destination being respectively substantially the same as respective places of departure and destinations of one or more particular registered routes when, for each of the one or more particular registered routes, the input place of departure is within a predetermined distance of a place of departure of that particular registered route and the input destination is within the predetermined distance of a destination of that particular registered route; a route search means for reading out the one or more particular registered routes from registered route information; an output means for, if a plurality of particular registered routes are read out from the route search means, outputting information related to the plurality of particular registered routes; a selection means for allowing the user to select one of the plurality of particular registered routes; and a control means for performing route guidance based on the selected particular registered route.

Further, according to the present invention, there is provided a method for providing guidance based on registered route information, including inputting a place of departure; inputting a destination; comparing the input place of departure and input destination to respective places of departure and destinations of registered routes; determining if the input place of departure and input destination are substantially the same as a respective place of departure and destination of a registered route, an input place of departure and an input destination being substantially the same as a respective place of departure and destination of a particular registered route when the input place of departure is within a predetermined distance of the place of departure of the particular registered route and the input destination is within the predetermined distance of the destination of the particular registered route; reading out, if the input place of departure and input destination are substantially the same as a respective place of departure and destination of the particular registered route, the particular registered route; and providing guidance.

Finally, according to the present invention, there is provided a method for providing guidance based on registered route information, including inputting a place of departure; inputting a destination; comparing the input place of departure and input destination to respective places of departure and destinations of registered routes; determining if the input place of departure and input destination are respectively substantially the same as respective places of departure and destinations of one or more registered routes, an input place of departure and an input destination being respectively substantially the same as respective places of departure and destinations of one or more particular registered routes when, for each of the one or more particular registered routes, the input place of departure is within a predetermined distance of a place of departure of that particular registered route and the input destination is within the predetermined distance of a destination of that particular registered route; reading out the one or more particular registered routes from registered route information; and outputting, if a plurality of particular registered routes are read out from the route search means, information related to the plurality of particular registered routes; allowing the user to select one of the plurality of particular registered routes; and performing, if a user has selected a particular registered route, guidance based on the selected particular registered route.

BRIEF DESCRIPTION OF THE DRAWINGS

Exemplary embodiments of the invention will now be described with reference to the accompanying drawings, wherein.

DETAILED DESCRIPTION OF PREFERRED EMBODIMENTS

Figure 1:
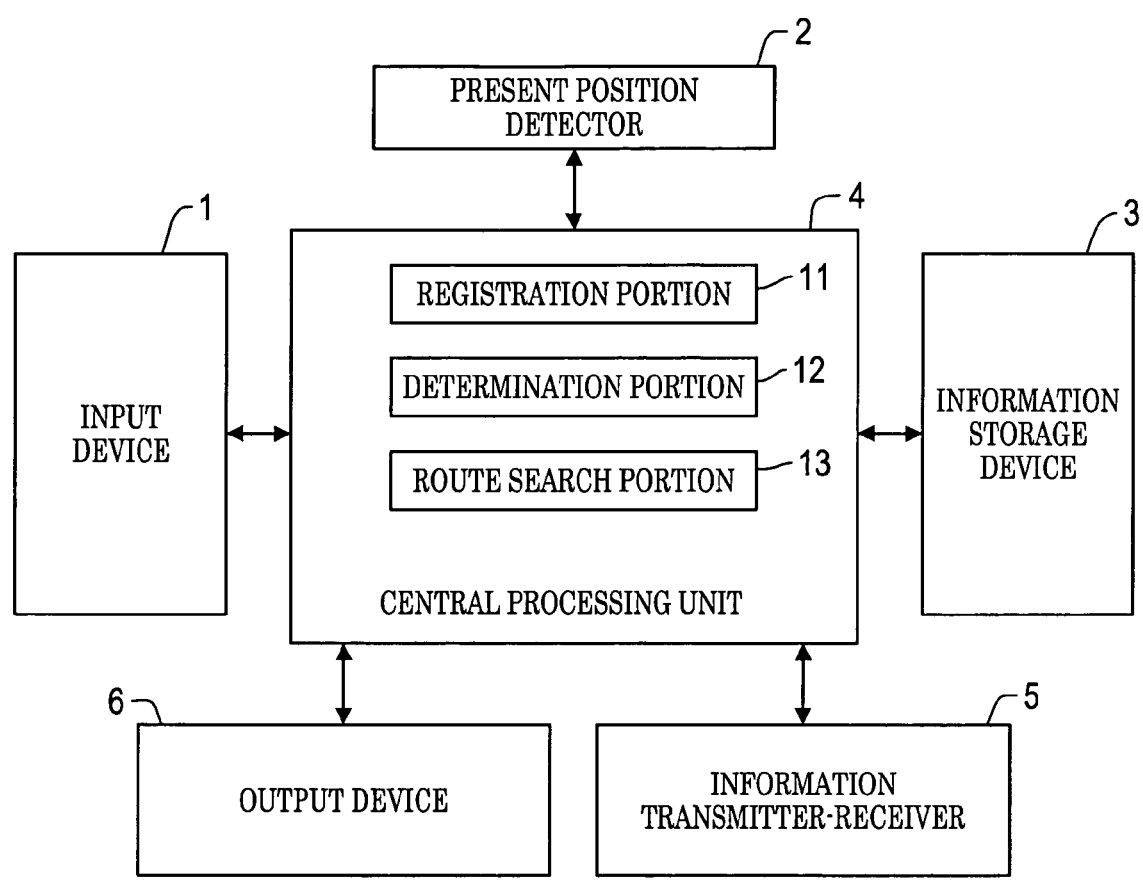
FIG. 1 is a diagram showing an embodiment of a navigation apparatus associated with the present invention.

FIG. 1 shows one example of a navigation apparatus that may be used with this exemplary embodiment of the present invention. It includes an input device 1 for inputting information related to route guidance, such as a place of departure and a destination; a present position detector 2 for detecting information related to a present position of a vehicle for use as, for example, a place of departure, or tracking a vehicle's location; an information storage device 3 in which map data, navigation data necessary for route search, visual/audio guidance data necessary for a route guidance, and programs (applications and/or operating systems) for performing map display, route search and guidance such as audio guidance are recorded; a central processor 4 for navigation processing, (for example, map display processing, route search processing, and display/audio guidance processing necessary for route guidance,) and for controlling the entire system; an information transmitter-receiver 5 for transmitting and receiving, for example, road information and traffic information, and information related to the present position of the vehicle; and an output device 6 such as a display and/or speaker for outputting information related to route guidance.

The central processor 4 of this embodiment has a registration portion 11 substantially dedicated to associating and registering a place of departure, a destination and a route that the vehicle traveled, as well as a function of recording travel time between a place of departure and a destination. The central processor 4 has a function of updating and registering the shortest traveling time and distance traveled between the place of departure and destination, which are within a predetermined range from the place of departure, and destination of the registered route associated with the place of departure and destination. The central processor 4 further has a determination portion 12 substantially dedicated to determining whether or not an input place of departure and input destination are within a predetermined range from the place of departure and the destination of registered route, and a route search portion 13 substantially dedicated to reading out information of the previously registered route when it is determined that the input place of departure and input destination are respectively within the predetermined range from the place of departure and the destination of the previously registered route, and searching for the route or routes with the lowest rates.

In this embodiment, the determination portion 12, varies the size of the predetermined range, which is used to determine whether an input place of departure and input destination are respectively within that predetermined range from the place of departure and the destination of a previously registered route. In various exemplary embodiments of the systems and methods according to this invention, the determination portion 12 varies the predetermined distance according to the distance between the input place of departure and the input destination. When the distance between the input place of departure and the input destination is long, the predetermined range is enlarged. Conversely, when distance between the input place of departure and the input destination is short, the range is narrowed.

In various other exemplary embodiments of the systems and methods according to this invention, when the input place of departure and input destination are within the predetermined range from a place of departure and a destination of a previously registered route, the determination portion 12 further determines whether a direction connecting the input place of departure and input destination is within a predetermined angle of a direction connecting a place of departure and a destination of a previously registered route. If both the input place of departure and input destination are respectively within the predetermined range of a place of departure and destination of a particular previously registered route and a direction connecting the input place of departure and the input destination is within a predetermined angle of a direction connecting the place of departure and the destination of that particular previously registered route, the route search portion 13 reads out information of that particular previously registered route and searches for the route or routes with the lowest rates.

One embodiment of a method for associating a place of departure, a destination and a traveled route and registering the associated place of departure, a destination and a traveled route will now be described with reference to FIGS. 2–5.

Figures 2, 3:
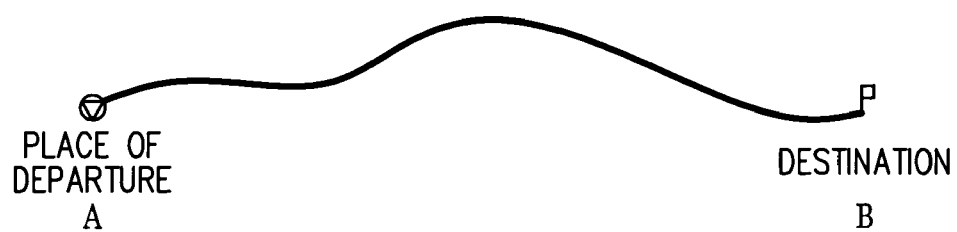
FIGS. 2–3 are diagrams for explaining a case which first registers a route that the vehicle traveled.

FIGS. 2 and 3 show exemplary views of a method for registering a first traveled route. FIG. 2 is a diagram showing a route from a place of departure to a destination and FIG. 3 is a diagram showing a route registration display on arrival at the destination.

When the vehicle travels a route (shown in FIG. 2), for example, that is often used by the user such as a commuter route connecting a place of departure A (home) and a destination B (workplace), the distance between the place of departure A and the destination B and the time required for the travel are recorded. For example, when the vehicle starts traveling, the recording of the traveling time is started, and when the vehicle approaches a point within a predetermined distance from the destination, it is determined that the vehicle has arrived at the destination and the recording of the traveling time is ended. As a method for determining that the vehicle has arrived at the destination, a condition such as reduction in speed of the vehicle near the destination may be added to the above-described predetermined distance. Thus, the determination whether or not the vehicle has arrived at the destination can be determined more accurately. When the vehicle has arrived at the destination, the guidance display shifts to a registration display as shown in FIG. 3. In this display, the place of departure, the destination, the traveling distance, the traveling time are displayed. Furthermore, a message "Register this route?" and selection request "Yes" and "No" are displayed. If "Yes" is selected, the place of departure, the destination and the route that the vehicle traveled are associated with and registered by, for example, the registration means 11. If "No" is selected, the place of departure, the destination and the route that the vehicle traveled are not registered. When the first route is registered, the traveling time and the traveling distance on that route are also registered.

Figures 4, 5:
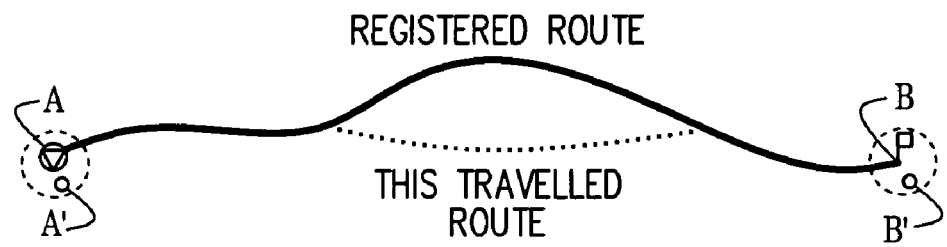
FIGS. 4–5 are diagrams for explaining a registration of a route where the same place of departure and same destination as those of a previously registered route are set.

FIGS. 4 and 5 are views of a method for registering a route when an input place of departure and an input destination are respectively within a predetermined range from a place of departure and a destination of a previously registered route. FIG. 4 shows a route from a place of departure to a destination. FIG. 5 shows a route registration picture on arrival at the destination.

When an input place of departure A' and an input destination B', are within the predetermined range (for example, within a radius of 500 m and shown by the dashed circles in FIG. 4) from a respective place of departure A and destination B of a particular previously registered route, various exemplary embodiments of the systems and methods according to this invention assume that the input place of departure and the input destination are respectively the same as the place of departure and the destination of the particular previously registered route, the particular previously registered route is read out and/or searched for with a high priority (i.e., low search cost).

Specifically, during a normal route search, for example, priority (or low search cost) is given in the following order: recommended roads, toll roads, general roads, roads of the shortest distance, and detours (from lowest search cost to highest search cost). When a route is found by the search and selected by the user, it is used for guidance. However, when the input place of departure and the input destination are within the predetermine range of a respective place of departure and destination of a particular previously registered route, the search cost for that particular registered route is lowered so that the particular registered route is determined to have the highest priority. Therefore, a route that meets the user's preference (as approximated by the user's previous driving habits) is returned.

In various other exemplary embodiments, the particular registered route is provided as a recommended route without performing operation of search cost. In this case, a recommended route which is impracticable may be changed, when based on traffic regulation data, the navigation device determines that one or more portions of the route are impassable. In this case, the navigation device only searches for a route or routes around that one or more impassable portions. Thus, the processing for the search is reduced and time required for route search processing is reduced as well.

Additionally, in various exemplary embodiments, if the user does not physically input a particular place of departure when searching for a route, the present position of the user's vehicle as determined by, for example, the present position detector 2 is regarded as the input place of departure.

In the case that the predetermined range is fixed, for example within 50 m radius, it can inconvenience a user. Particularly, it is more likely that a user may not be able to utilize a registered route because an input place of departure or an input destination might be outside the predetermined range when the distance between the input place of departure and the input destination becomes long. Therefore, in various exemplary embodiments of the systems and methods according to this invention, the predetermined range varies according to the distance between the input place of departure and the input destination. For example, when the distance between the input place of departure and the input destination is within 1 km, the predetermined range is a 50 m radius. Then, for every 5 km that the distance between the input place of departure and the input destination increases, the radius of the predetermined range is extended by 200 m. Thus, registered routes are effectively utilized by varying the predetermined range according to the distance between the input place of departure and the input destination. In various exemplary embodiments, the distance between the input place of departure and the input destination, for example, is calculated from coordinates of the input place of departure and the input destination as the distance in a straight line by central processor 4.

Furthermore, in various exemplary embodiments, instead of defining a predetermined range by a radius, geographic areas may be utilized. In that case, the predetermined range such as a city block, a neighborhood, a city, a county, a state, etc. may be used and sequenced from smallest to largest as the distance between the place of departure and the destination increases.

When the predetermined range is extended in accordance with the distance between the input place of departure and the input destination, especially in the case of great distance, a slight difference between a direction connecting the input place of departure and the input destination and a direction connecting a place of departure and destination of a registered route could make a big difference in the likelihood that a user will prefer the registered route. Therefore, various exemplary embodiments of the systems and methods according to this invention further reduce a search cost for a particular registered route when a direction connecting the input place of departure and the input destination is within a predetermined angle of a direction connecting the place of departure and the destination of the particular previously registered route.

When a registered route is searched for and guidance is performed (route indicated by a solid line of FIG. 4) and the vehicle deviates from the registered route, a new search is performed. As such, the vehicle travels a route indicated by a dotted line of FIG. 4. When the vehicle arrives at the destination, the place of departure, the destination, a travel distance and shortest travel time for the originally returned route; a travel distance and travel time of the traveled route; and a selection request to register the traveled route, are displayed as shown on guidance display of FIG. 5. By displaying the shortest travel time for the originally returned route together with a travel time of the traveled route, a criterion for whether to update and register the traveled route is provided to the user. Because the route to be updated and registered is based on the user's driving preference, the route that meets the user's preference can be provided in the future.

When the vehicle deviates from the registered route, as described above, a new search is performed and a route that leads back to the original route is provided. Because the new search is performed so as to lead the vehicle back to the original route, the user can still use the registered route even if he or she inadvertently deviates from the route. Furthermore, if a road that the vehicle traveled while deviating from the registered route is a road that is not usually used for a search (e.g., it is not in the map data), for example, an alley, that road can be registered as part of a new route. In this case, because, for example, the alley was not in the map data, markings may be displayed on the alley so that the user can identify the alley. Thus, a registered route can be used even if a road that cannot be searched for is registered.

Figure 6:
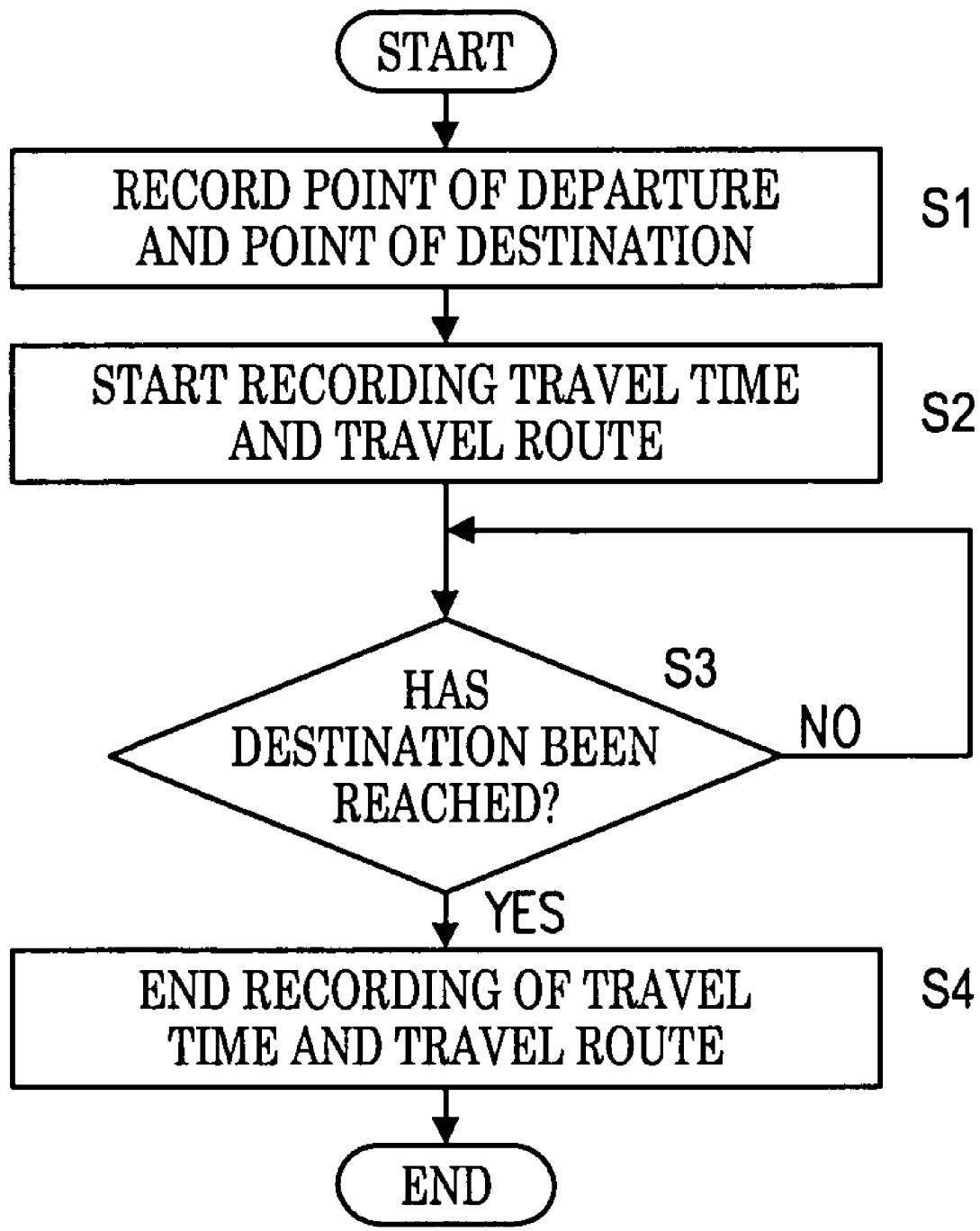
FIG. 6 is a diagram for explaining a processing flow for registering a traveling route.

FIG. 6 is a diagram for explaining a processing flow for recording a traveling route. As shown in FIG. 6, first, input points of departure and destination are recorded, and the recording of the travel time and the recording of the travel route are started (steps S1 and S2). Then it is determined whether the vehicle has reached the destination (step S3). When the vehicle has reached the destination, the recording of the travel time and the recording of the travel route end (step S4). As a result, the travel time and the travel route (including the traveling distance) from the place of departure to the destination are recorded.

Figure 7:
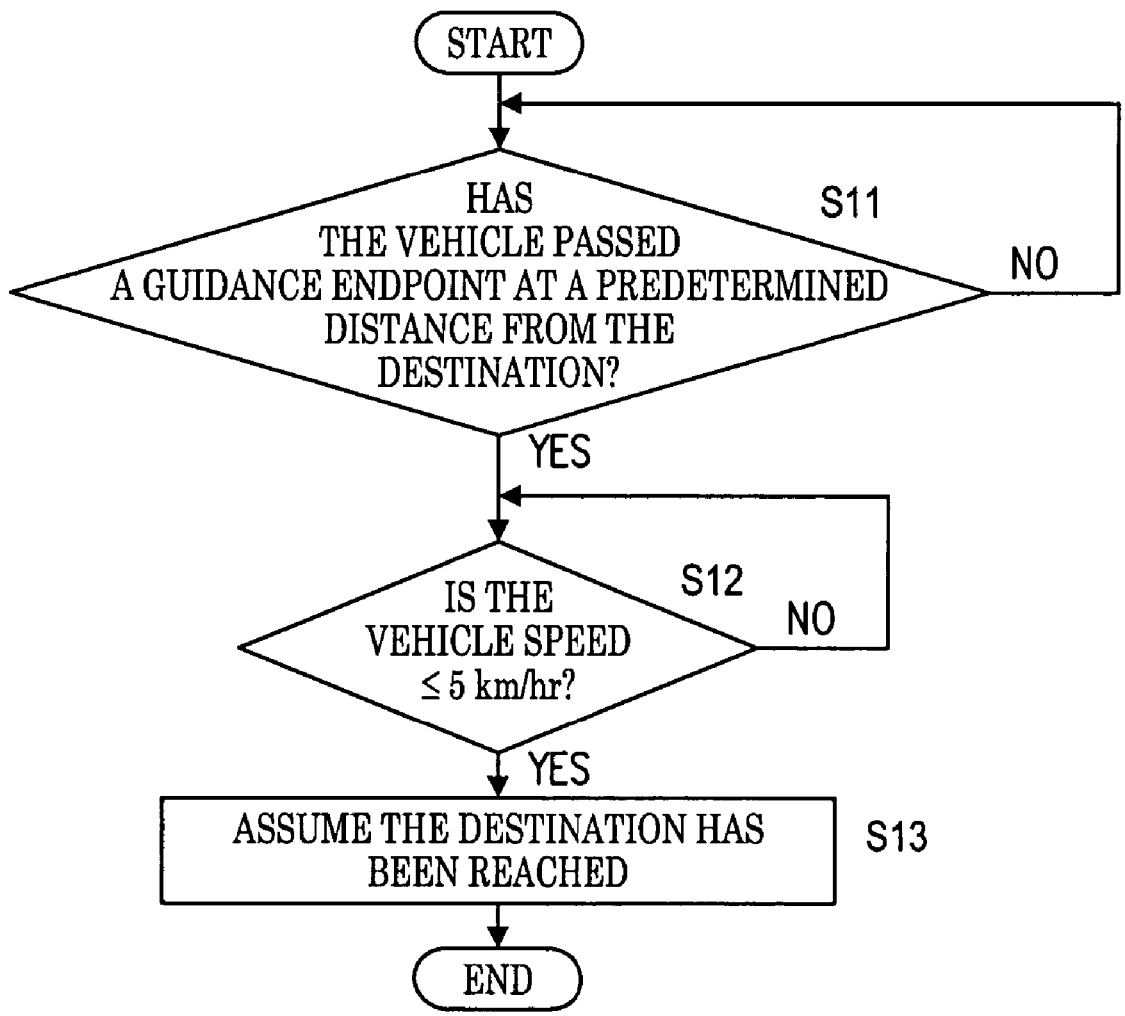
FIG. 7 is a diagram for explaining a processing flow for determining whether the vehicle arrived at a destination.

FIG. 7 is a diagram for indicating a determination processing flow whether the has vehicle arrived at the destination. As shown in FIG. 7, it is determined whether the vehicle has passed a guidance end point that is at a predetermined distance from the destination (step S11). Once the vehicle passes the guidance end point, it is determined whether the speed of the vehicle is less than or equal to 5 km/h (step S12). If the speed of the vehicle is less than or equal to 5 km/h, it is assumed that the vehicle has arrived at the destination (step S13).

Figure 8:
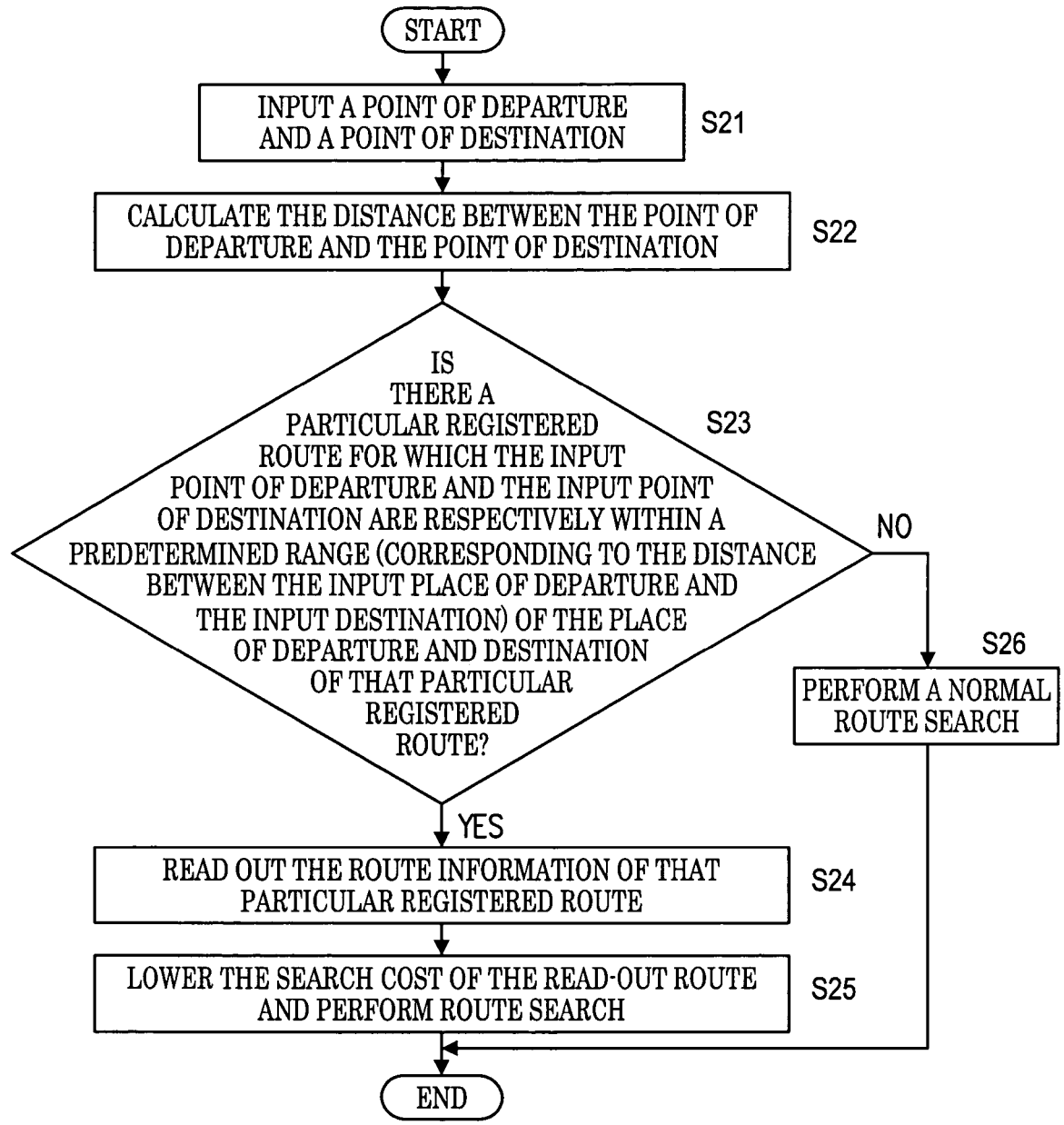
FIG. 8 is a diagram for explaining a processing flow for searching a registration route.

FIG. 8 is a diagram for explaining a processing flow for searching using a registered route. As shown in FIG. 8, when a point of departure and a point of destination are input (step S21), the distance between the two points is calculated from the coordinates of the input departure point and input destination point (step S22). Then, it is determined whether or not there is a particular registered route for which the input point of departure and the input destination point are respectively within the predetermined range (which corresponds to the calculated distance between the place of departure and the destination) of the point of departure and destination of the particular registered route (step S23). If there is such a particular registered route, the route information of the particular registered route is read out (step S24), the search cost of the read out route is lowered, and a route search is performed (step S25). In this manner, the particular registered route is preferentially searched due to the lower search cost. If there is no particular registered route at step S22, a normal route search is performed (step S26).

Figure 9:
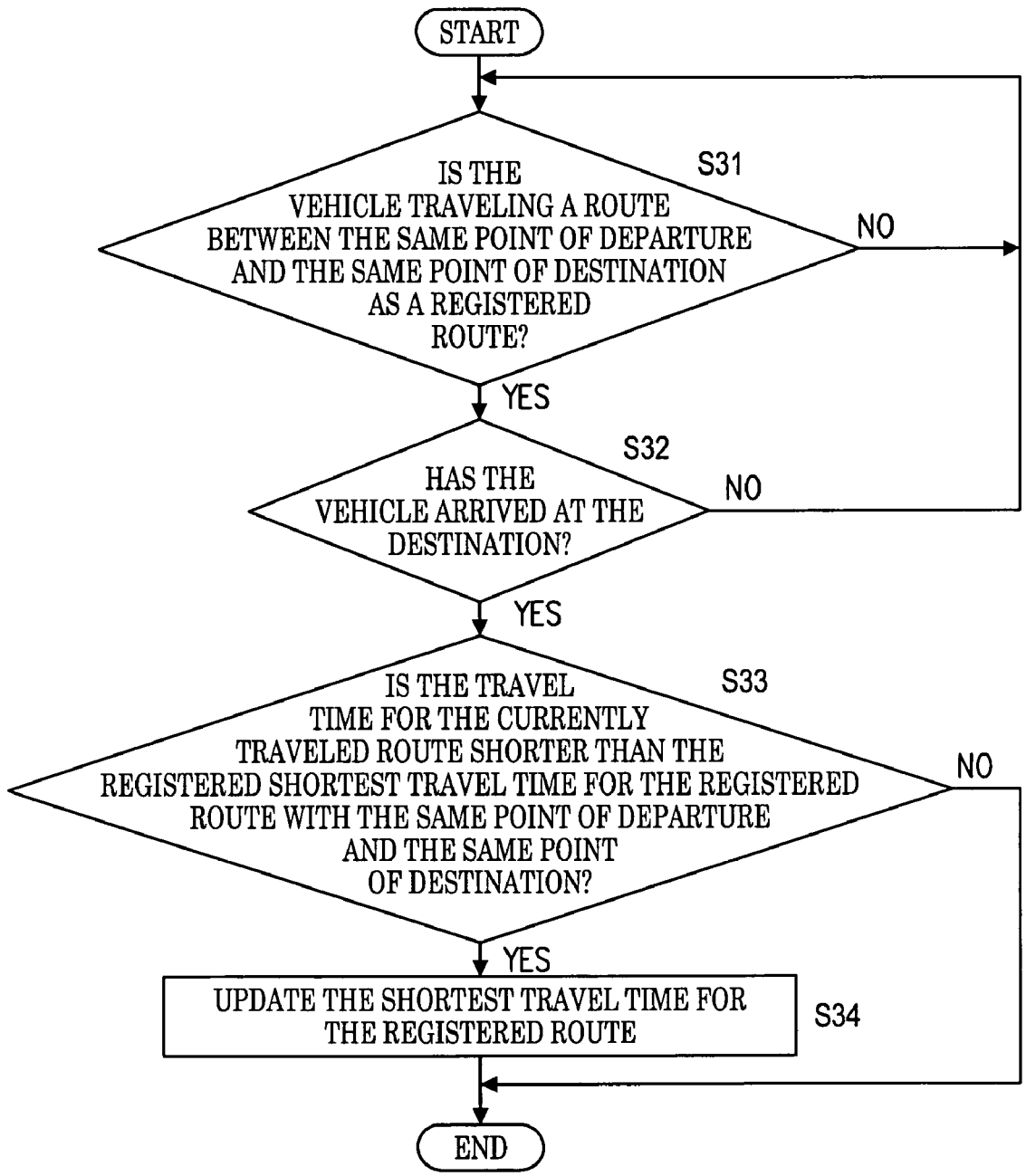
FIG. 9 is a diagram for explaining a processing flow for updating of the shortest travel time.

FIG. 9 is a diagram explaining a processing flow for updating the shortest travel time. As shown in FIG. 9, when the vehicle travels a route between a substantially same point of departure and a substantially same destination, within the predetermined range, as a respective point of departure and destination of a previously registered route and arrives at the destination (step S31, S32), it is determined whether the travel time is the shortest travel time for that route (step S33). If the traveled route has the shortest travel time the travel time is updated (step S34).

Figure 10:
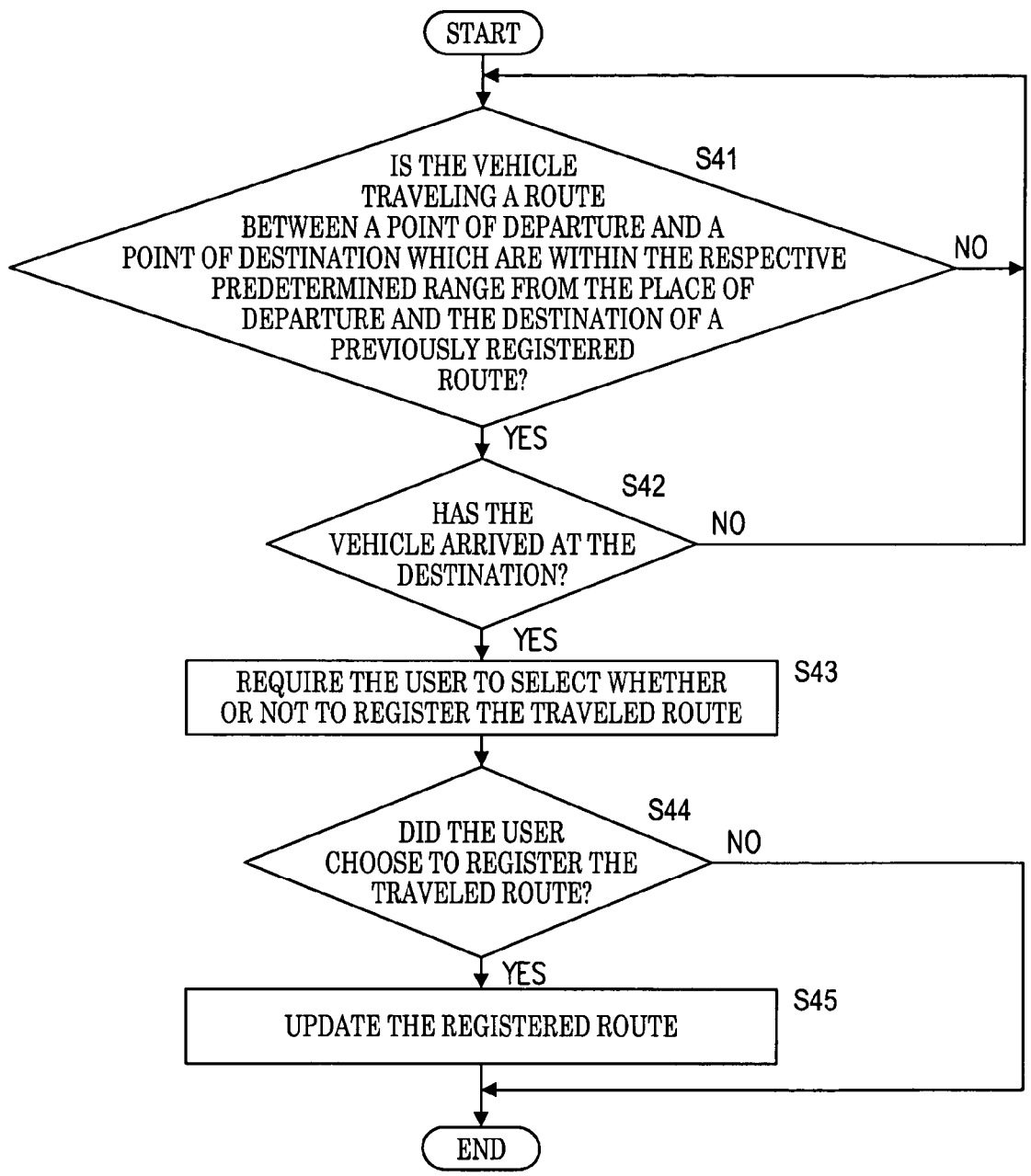
FIG. 10 is a diagram for explaining a processing flow for updating of a registration route.

FIG. 10 is a diagram for explaining a processing flow for updating a registered route. As shown in FIG. 10, when the vehicle travels a route between an identifiable point of departure and an identifiable point of destination which are within the respective predetermined range from the place of departure and the destination of the previously registered route (step S41) and arrives at the destination (step S42), the user is required to select whether or not to register the traveled route (step S43). If the user selects to register (step S44), the registered route is updated (step S45).

Figure 11:
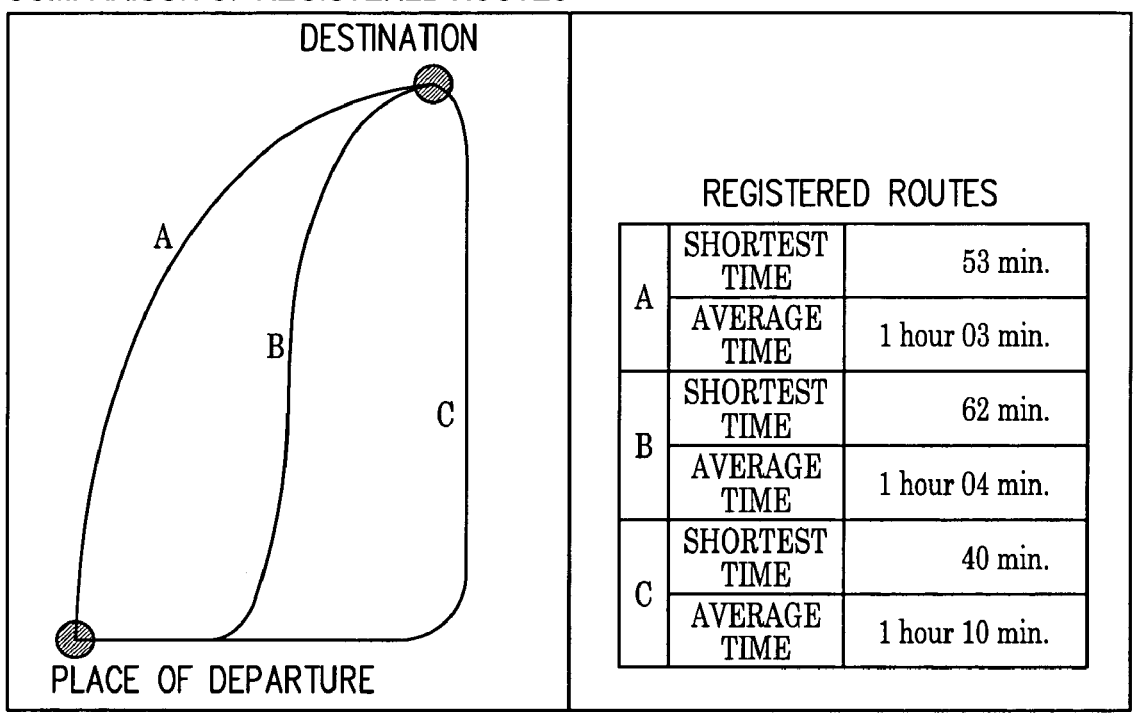
FIG. 11 is a diagram for explaining an embodiment for associating and registering a place of departure, a destination, and plural routes that the vehicle traveled.

In addition to registering a single route for each place of departure and destination, various exemplary embodiments of the systems and methods according to this invention associate and register a place of departure, a destination, and a plurality of routes that the vehicle traveled. FIG. 11 is a diagram for explaining one embodiment that associates and registers a place of departure, a destination, and a plurality of routes that the vehicle traveled. The view shows registered plural routes and time information for the registered routes.

Routes A, B, and C are routes registered, for example, by the registration portion 11 of FIG. 1, and have a place of departure and a destination, for which a respective input place of departure and input destination are within the predetermined range. As in the previously described embodiments, this predetermined range is variable in accordance with the distance between an input place of departure and an input destination. The routes can be registered by a method similar to the method described with reference to FIG. 2. During registration the shortest travel time and the average travel time of each route are registered as route information, as shown in FIG. 11. If a route was traveled twice or more, the shortest time of the respective traveling times is registered. If the route was traveled only once, that travel time is registered. Furthermore, if the route was traveled twice or more, the average of the respective traveling times is registered. If the route was traveled only once, that travel time is registered as the average travel time. While only the shortest time and the average travel time are registered in this example, various other data, such as, the longest time, the traveling distance, and the like may also be registered.

When an input place of departure and an input destination are within the predetermined range of the respective place of departure and the destination of one or more registered routes, as described above, route information such as the route and the time required is output by a method, such as on a display, as shown in FIG. 11. Based on the output route information, the user may compare the various registered routes and select a route that meets his or her purpose. When one of the registered routes is selected, guidance is provided along that selected route. As the three routes A, B and C are compared in the example shown in FIG. 11, both the shortest travel time and the average travel time of route A are shorter than those of route B and therefore it can easily be determined that route A has a shorter travel time. As for the route C, the shortest travel time is shorter than those of the other two routes but the average travel time is longer. Since there is a large difference between the shortest time and average time, it can be determined that the route C tends to be congested. Thus, by comparing the information of the routes, the user can select a route for his or her purpose. Furthermore, if the longest travel time, the travel distance and the like are registered as well, this information can be output and compared, such that the user can select a route more accurately.

Figure 12:
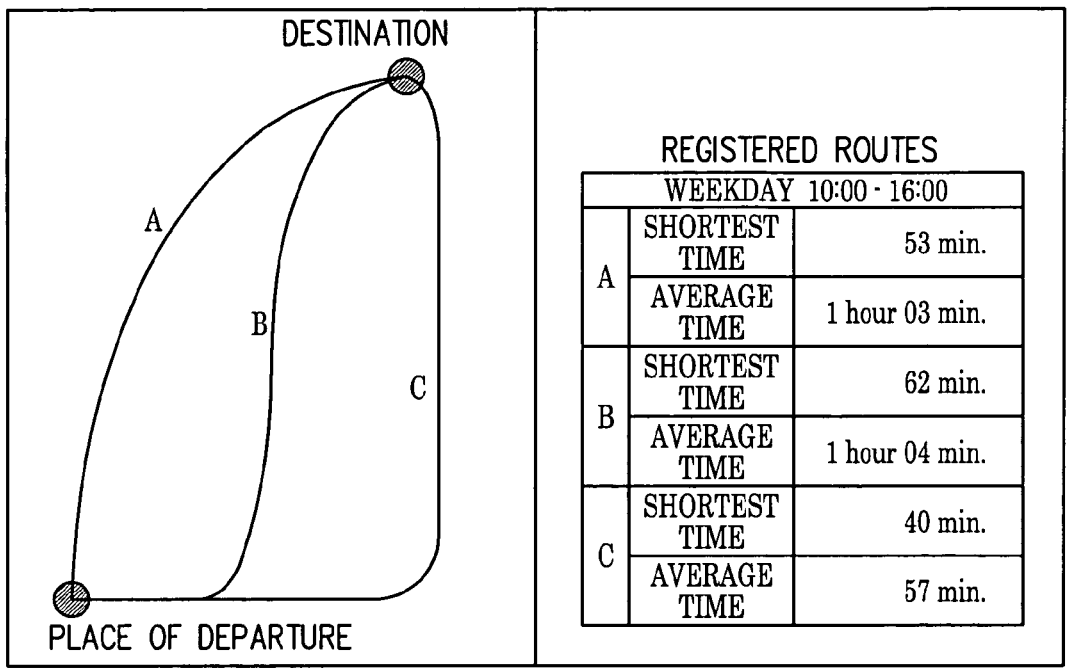
FIGS. 12–13 are diagrams for explaining an embodiment that additionally stores calendar information and traveling time slot information for plural routes to be registered.
Figure 13:
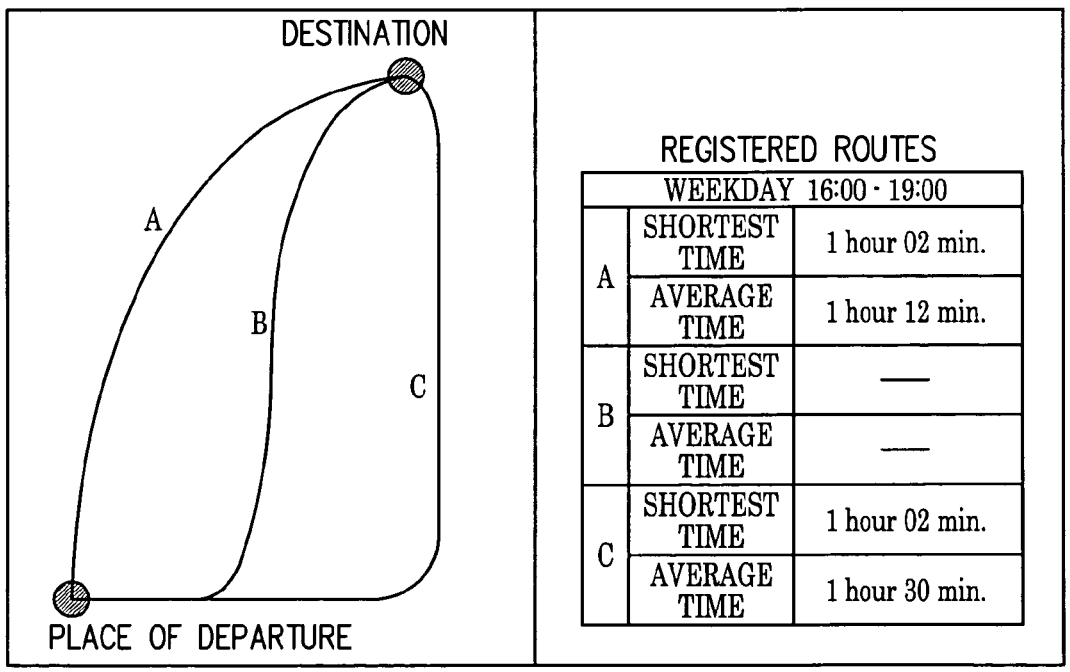

FIGS. 12 and 13 show exemplary views of an embodiment that additionally stores calendar information (e.g., day of the week) and travel time slot information (e.g., time of day) for plural routes to be registered, when compared to the embodiment of FIG. 11. FIG. 12 shows registered route information in the case of weekday and daytime travel. FIG. 13 shows route information in the case of weekday and evening travel.

Routes A, B and C are routes registered, for example, by the registration portion 11 of FIG. 1 and have a place of departure and a destination for which a respective input place of departure and input destination are within the predetermined range. Again, the predetermined range is variable in accordance with a distance between an input place of departure and an input destination. Similar to the exemplary embodiment shown in FIG. 11, the shortest time and the average time are registered as route information. However, calendar information, travel time slot information, and the like are also registered. As the travel time slot, the departure time and the arrival time, early morning, daytime, evening, night, late night, or morning and afternoon may be used. Also in this exemplary embodiment, the longest travel time, the travel distance, and the like, may be registered in addition to the shortest travel time and the average travel time.

When an input place of departure and an input destination which are within the predetermined range from a place of departure and a destination of the registered route, route information such as calendar information, travel time slot and travel time as well as the route is output by a method, such as on a display, as shown in FIGS. 11 and 12. Thus, suitable output methods may be employed, for example, displaying the picture of FIG. 11 and indicating that there is a continuing picture, or displaying the pictures of FIG. 11 and FIG. 12 in one picture. Of course, according to this embodiment, it is only possible to display one of the calendar information values and one of the travel time slot values for each comparison table. Based on the output route information, the user may compare the registered individual routes and select a route that meets his or her purpose. Then, guidance is provided along the selected route. In the example shown in FIGS. 12 and 13, during the weekday and daytime (10:00–16:00) route travel (shown in FIG. 12), both the shortest travel time and the average travel time of route C are shorter than those of route A. Therefore, it can be determined that the route C has a shorter travel time. However, during weekday and evening travel (16:00–19:00) (shown in FIG. 13), route C is congested and the average travel time of route A is shorter than that of C. In FIG. 13, it is indicated that route B has never been traveled in the evening. Thus, by comparing the information of the individual routes in consideration of the travel time slot, the user can select a route more accurately. If the longest travel time, the travel distance and the like are registered, as well, this information can be output and compared, such that the user can select a route that meets the user's preference better.

While this invention has been described in conjunction with exemplary embodiments, these embodiments should be viewed as illustrative, not limiting. Various modifications, substitutes, or the like are possible within the spirit and scope of the invention.

What is claimed is:

1. A navigation apparatus for a vehicle comprising:
   a registration means for registering a place of departure, a destination, and a route traveled by the vehicle;
   a determination means for determining whether an input place of departure is substantially the same as a place of departure of a registered route and an input destination is substantially the same as a place of departure of the registered route, an input place of departure being substantially the same as a place of departure of a particular registered route and an input destination being substantially the same as a destination of the particular registered route when the input place of departure is within a predetermined distance of the place of departure of the particular registered route and the input destination is within the predetermined distance of the destination of the particular registered route;
   a route search means for reading out the particular registered route from registered route information and for returning the read out particular registered route without performing a search; and
   a control means for performing route guidance based on a route returned by the search means;
   wherein if it is determined that it is impossible to travel one or more portions of the read out particular registered route, the route search means is also for:
   searching, for each of the one or more impossible portions of the read out particular registered route, for a route around that impossible portion of the read out particular registered route; and
   returning a route comprising all portions of the read out particular registered route that are possible to travel and each of the searched for routes around the one or more impossible sections of the read out particular registered route.

2. The navigation apparatus of claim 1, wherein the predetermined distance is determined based on a distance between the input place of departure and the input destination.

3. A navigation apparatus for a vehicle comprising:
   a registration means for registering a place of departure, a destination, and a route traveled by the vehicle;
   a determination means for determining whether an input place of departure is substantially the same as a place of departure of a registered route and an input destination is substantially the same as a place of departure of the registered route, an input place of departure being substantially the same as a place of departure of a particular registered route and an input destination being substantially the same as a destination of the particular registered route when the input place of departure is within a predetermined distance of the place of departure of the particular registered route and the input destination is within the predetermined distance of the destination of the particular registered route;
   a route search means for reading out the particular registered route from registered route information; and
   a control means for performing route guidance based on a route returned by the search means;
   wherein an input place of departure and input destination are only substantially the same as the respective place of departure and destination of the particular registered route, if a direction connecting the input place of departure and the input destination is within a predetermined angle of a direction connecting the place of departure and the destination of the particular registered route.

4. The navigation apparatus of claim 3, wherein the predetermined distance is defined by one or more geographical areas.

5. A navigation apparatus for a vehicle comprising:
   a registration means for registering a place of departure, a destination, and a route traveled by the vehicle;

a determination means for determining whether an input place of departure is substantially the same as a place of departure of a registered route and an input destination is substantially the same as a place of departure of the registered route, an input place of departure being substantially the same as a place of departure of a particular registered route and an input destination being substantially the same as a destination of the particular registered route when, for each of the one or more particular registered routes, the input place of departure is within a predetermined distance of a place of departure of that particular registered route and the input destination is within the predetermined distance of a destination of that particular registered route;

a route search means for reading out the one or more particular registered routes from registered route information;

an output means for, if a plurality of particular registered routes are read out from the route search means, outputting information related to the plurality of particular registered routes;

a selection means for allowing the user to select one of the plurality of particular registered routes; and a control means for performing, if a user has selected a particular registered route, route guidance based on the selected particular registered route;

wherein the input place of departure and the input destination are only respectively substantially the same as the respective places of departure and destinations of the one or more particular registered routes, if, for each of the one or more particular registered routes, a direction connecting the input place of departure and the input destination is within a predetermined angle of a direction connecting the place of departure and the destination of that particular registered route.

6. The navigation apparatus of claim 5, wherein the predetermined distance is determined based on a distance between the input place of departure and the input destination.

7. The navigation apparatus of claim 5, wherein the predetermined distance is defined by one or more geographical areas.

8. A method for providing guidance based on registered route information, comprising:

inputting a place of departure;
inputting a destination;
comparing the input place of departure and input destination to respective places of departure and destinations of registered routes;
determining if the input place of departure and input destination are substantially the same as a respective place of departure and destination of a registered route, an input place of departure and an input destination being substantially the same as a respective place of departure and destination of a particular registered route when the input place of departure is within a predetermined distance of the place of departure of the particular registered route and the input destination is within the predetermined distance of the destination of the particular registered route;
reading out, if the input place of departure and input destination are substantially the same as a respective place of departure and destination of the particular registered route, the particular registered route;
providing guidance;
determining whether it is possible to travel all sections of the read out particular registered route; and searching, if it is impossible to travel one or more sections of the read out particular registered route, for, for each of the one or more impassable sections, a route around that one or more impossible section of the read out particular registered route;
wherein providing guidance comprises returning a route comprising all sections of the read out portion of the particular registered route that are possible to travel and each of the searched for routes around the one or more impossible sections of the read out particular registered route.

9. The method of claim 8, further comprising adjusting the predetermined distance based on a distance between the input place of departure and the input destination.

10. A method for providing guidance based on registered route information, comprising:

inputting a place of departure;
inputting a destination;
comparing the input place of departure and input destination to respective places of departure and destinations of registered routes;
determining if the input place of departure and input destination are substantially the same as a respective place of departure and destination of a registered route, an input place of departure and an input destination being substantially the same as a respective place of departure and destination of a particular registered route when the input place of departure is within a predetermined distance of the place of departure of the particular registered route and the input destination is within the predetermined distance of the destination of the particular registered route;
reading out, if the input place of departure and input destination are substantially the same as a respective place of departure and destination of the particular registered route, the particular registered route; and
providing guidance;
wherein an input place of departure and input destination are only respectively substantially the same as the respective place of departure and destination of the particular registered route, if a direction connecting the input place of departure and the input destination is within a predetermined angle of a direction connecting the place of departure and the destination of the particular registered route.

11. The method of claim 10, wherein the predetermined distance is defined by one or more geographic areas.

12. A method for providing guidance based on registered route information, comprising:

inputting a place of departure;
inputting a destination;
comparing the input place of departure and input destination to respective places of departure and destinations of registered routes;
determining if the input place of departure and input destination are respectively substantially the same as respective places of departure and destinations of one or more registered routes, an input place of departure and an input destination being respectively substantially the same as respective places of departure and destinations of one or more particular registered routes when, for each of the one or more particular registered routes, the input place of departure is within a predetermined distance of a place of departure of that particular registered route and the input destination is within the predetermined distance of a destination of that particular registered route;

reading out, if the input place of departure and input destination are respectively substantially the same as respective places of departure and destinations of one or more registered routes, the one or more particular registered routes from registered route information;

outputting, if a plurality of particular registered routes are read out from the route search means, information related to the plurality of particular registered routes;

allowing the user to select one of the plurality of particular registered routes; and performing, if a user has selected a particular registered route, guidance based on the selected particular registered route;

wherein the input place of departure and the input destination are only respectively substantially the same the respective places of departure and destinations of the one or more particular registered routes, if, for each of the one or more particular registered routes, a direction connecting the input place of departure and the input destination is within a predetermined angle of a direction connecting the place of departure and the destination of that particular registered route.

13. The method of claim 12, further comprising adjusting the predetermined distance based on a distance between the input place of departure and the input destination.

14. The method of claim 12, wherein the predetermined distance is defined by one or more geographical areas.

* * * * *